United States Patent [19]

Sarnacke et al.

[11] 3,854,958

[45] Dec. 17, 1974

[54] STABILIZATION OF ETHYL CELLULOSE WITH SODIUM OMICRON AND RHO NITROBENZOATES

[75] Inventors: Philip M. Sarnacke; Wesley L. Archer, both of Midland, Mich.

[73] Assignee: The Dow Chemical Company, Midland, Mich.

[22] Filed: July 23, 1973

[21] Appl. No.: 381,943

Related U.S. Application Data

[63] Continuation-in-part of Ser. No. 289,005, Sept. 14, 1972, abandoned.

[52] U.S. Cl.................. 106/14, 106/178, 106/189, 106/191
[51] Int. Cl.... C09d 5/08, C08b 27/48, C08b 27/36
[58] Field of Search.................. 106/178, 14; 289/5

[56] References Cited

UNITED STATES PATENTS

| 2,402,551 | 6/1946 | Holt | 106/14 |
| 2,623,835 | 12/1952 | Van Melsen | 106/14 |
| 2,694,059 | 11/1954 | Lamborn | 260/232 |

OTHER PUBLICATIONS

Chem. Abst., 46:9497h 1952.

*Primary Examiner*—Theodore Morris
*Attorney, Agent, or Firm*—David B. Kellom

[57] ABSTRACT

Ethyl cellulose is stabilized to prevent corrosion and discoloration in the presence of iron and water by blending with an inhibiting amount of sodium o-nitrobenzoate or sodium p-nitrobenzoate.

6 Claims, No Drawings

STABILIZATION OF ETHYL CELLULOSE WITH SODIUM OMICRON AND RHO NITROBENZOATES

BACKGROUND

This application is a continuation-in-part of application Ser. No. 289,005, filed Sept. 14, 1972 now abandoned.

Ethyl cellulose has been employed extensively s an organic-soluble, thermoplastic coating material for shaped, molded and extruded articles, including films and fibers. It is normally applied by either a hot-dip or solvent evaporation process using a formulated ethyl cellulose composition containing appropriate solvents, pigments, and modifying agents to improve flexibility, gloss and adhesion of the coating film.

Alos, it is conventional to stabilize ethyl celulose compositions against light, oxidative, and thermal degradation. Suitable phenolic antioxidants are decribed, for example, by Lincoln, U.S. Pat. No. 2,849,325 or Koch & Pyle, U.S. Pat. No. 2,535,360. Effective copper thermal stabilizers are described by Van Wyck, U.S. Pat. Nos. 2,561,892 and 2,561,893. De Lap, U.S. Pat. No. 2,914,416, uses a stabilizer blend of a phenolic antioxidant, an acid accepting epoxide, and a neutral organic phosphite. A high temperature amine-molybdenum disulfide stabilizer is disclosed in Stacy & Beaver, U.S. Pat. No. 3,415,963. In U.S. Pat. No. 2,623,835 van Melsen described polyvalent salts or soaps of substituted aromatic monocarboxylic acids as corrosion inhibitors.

However, the usual stabilizer systems are not fully satisfactory in preventing discoloration of ethyl cellulose compositions from corrosive activity in the presence of iron and moisture, conditions which may be encountered in storage or in preparing and using ethyl cellulose lacquers.

STATEMENT OF THE INVENTION

It has been discovered that sodium o-nitrobenzoate andsodium p-nitrobenzoate are capable of preventing or considerably reducing the corrosion of iron by ethyl cellulose and moisture when blended in minor amount with ethyl cellulose neutralized to an apparent pH greater than about 5.7. This effectively reduces discoloration of lacquers and coatings prepared from the stabilized ethyl cellulose. In a preferred embodiment, a particulate ethyl cellulose is dry blended with about 1–5 wt. % of the sodium o-nitrobenzoate or sodium p-nitrobenzoate stabilizer.

GENERAL DESCRIPTION

The degree ofsubstitution and viscosity of the ethyl cellulose do not affect the stabilizing action of the sodium o- and p-nitrobenzoates. For coating and molding applications ethyl cellulose is commercially available as fine white granules or particulate flakes having a degree of substitution (D.S.) ofabout 2.1–2.7 and a 5 wt. % solution viscosity of about 5–300 cps in a standard toluene:2B ethanol solvent blend at 25°C. (A.B. Savage, Enc. Poly. Sci. Tech., 3, 475 (1964)). For most lacquer formulations a D.S. ofabout 2.3–2.6 and a low to intermediate viscosity grade is generally preferred.

In the presence of the small amount of water normally encountered in ethyl cellulose lacquer formulations, sodium o- or p-nitrobenzoate appears to interact with an iron or steel surface to inhibit corrosion of the metal and formation of rust and other colored bodies which discolor the lacquer and resulting ethyl cellulose coatings. Although intended primarily to stabilize ethyl cellulose in lacquer formulations, sodium o- or p-nitrobenzoate also function in other systems where the ethyl cellulose contacts iron in the presence of moisture.

Surprisingly, the sodium o-nitrobenzoate and sodium p-nitrobenzoate are singularly effective in preventing or minimizing corrosion and discoloration in the presence of iron and water, as described herein, for periods of time up to 60 days. Closely related compounds such as sodium benzoate and potassium, calcium and manganese p-nitrobenzoates are ineffective for substantially shorter periods of time.

For best results with these stabilizers in lacquer formulations, it is important that the ethyl cellulose be neutralized to an apparent pH greater than about 5.7, and preferably about 5.7–8.0, measured as a 5 wt. % solution in 80:20 toluene:2B alcohol (95% ethanol denatured with 0.5% benzene). This neutralization can be achieved during purification of the ethyl cellulose or by blending a suitable buffering or neutralizing agent with the dry particulate product or with the lacquer formulation prior to contact with iron. Suitable neutralizing agents include ammonia, sodium bicarbonate and similar watersoluble bases. Alkali metal salts of weak organic acids such as sodium acetate, sodium benzoate, potassium phthalate, and sodium propionate can also be used to buffer or neutralize the ethyl cellulose as required for optimum effectiveness of the sodium nitrobenzoate inhibitors.

The sodium nitrobenzoates can be employed in combination with other conventional ethyl cellulose coating additives, including plasticizers such as dibutyl phthalate, diethyl phthalate, butyl stearate, triphenyl phosphate, tricresyl phosphate, raw castor oil, nonvolatile mineral oils, methyl phthalyl ethyl glycolate, hydrogenated methyl abietate, and the like, may be incorporated as usual with the ethyl cellulose. Likewise, resins, such as the oil-soluble phenol aldehyde condensates, ester gum, hydrogenated glycerol abietate, pentaerythritol abietate, rosin, and oil-modified alkyd resins, would also be included although, as a rule, these substances are not used extensively in plastics intended for lacquers. Similarly, waxes, such as paraffin, microcrystalline petroleum waxes, carnauba wax, candelilla wax, montan wax, and Japan wax, may also be included. Pigments, dyes and fillers may also be included.

Typical solvents for ethyl cellulose lacquers include aromatic hydrocarbons such as benzene and toluene as well as aromatic petroleum fractions, frequently blended with alcohol or aliphatic ester solvents. Particularly with solvent blends containing methanol, ethanol or isopropanol, small amounts of water are also incorporated into the coating lacquer. It is these lacquer formulations which may contain about 1–10% water for which the nitrobenzoate inhibitors are particularly effective.

There is no critical minimum concentration of the sodium nitrobenzoate inhibitor since even small quantities incorporated with the ethyl cellulose will provide some protection from discoloration in the presence of iron and water. Normally about 0.5–10 wt. % of the nitrobenzoate stabilizer provides effective stabilization for most coating applications and conditions. Somewhat greater amounts may be required if used in conjunction with a heavy metal thermal stabilizer such as the copper compounds of Van Wyck, U.S. Pat. No. 2,561,893.

The sodium nitrobenzoate stabilizers may be incorporated by addition or blending before or during formulation of an ethyl cellulose coating composition. Advantageously, it is incorporated by blending with a neutralized ethyl cellulose in the final manufacturing stage. Yet it can also be incorporated along with a suitable neutralizing or buffering agent when the coating formulation is prepared. For example, in preparing an ethyl cellulose lacquer, the stabilizer can be added to the lacquer solvent during or prior to the dissolution of other lacquer ingredients.

The resulting stabilized ethyl cellulose compositions have improved color stability in the presence of iron and water under normal coating conditions at room temperature and also in accelerated stability tests at 75°C.

The following examples provide further illustration. Unless otherwise specified, all parts and percentages are by weight. Ethyl cellulose analyses are by the standard methods of ASTM D-914-69.

EXAMPLES

For the following tests, a standard ethyl cellulose lacquer was prepared by dissolving 50 parts of a commercial ethyl cellulose having a D.S. of 2.30, a 5% viscosity of 70 cps and containing less than 10 ppm Cu in 950 parts of an 80:20 toluene:2B 95% ethanol blend. This lacquer had an apparent pH of about 5.5 measured with a pH meter.

To each test jar containing 100 g of the ethyl cellulose lacquer was added a cleaned and weighed No. 1020 mild steel test coupon measuring about 1×2×3/16 inches. The coupons were left in the lacquer solution at room temperature. Periodically the color of the lacquer and the condition of the coupons were examined. At the end of the test period, the coupons were recovered, cleaned and reweighed to determine the weight loss. The degree of discoloration compared with a control standard was visually rated according to the following scale:

0 - Clear, no visible discoloration
1 - Clear, slight yellow discoloration
2 - Clear, yellow discoloration
3 - Clear-cloudy, very yellow discoloration Typical results shown in the following table indicate the effectiveness of sodium o-nitrobenzoate and sodium p-nitrobenzoate as stabilizers for ethyl cellulose compositions in the presence of iron and water. Note the general correlation of color and coupon weight loss. Similar tests have shown that higher levels of the stabilizer are required for ethyl cellulose containing significantly higher levels of Cu, e.g. about 30–60 ppm. Also, the stabilizers appear more effective at a higher pH level with a higher Cu level.

| Test | Additive | pH | Time | Color | Coupon Loss, % |
|---|---|---|---|---|---|
| 1 | None | — | 48 hours | 2 | 0.32 |
| 2 | 1% Na o-nitrobenzoate | 7.0 | 11 days | 0 | 0.01 |
| 3 | 5% Na o-nitrobenzoate | 7.0 | 11 days | 0 | 0.01 |
| 4 | 3% Na p-nitrobenzoate | 7.7 | 14 days | 0 | 0.01 |
| 5 | 3% Na p-nitrobenzoate | 7.6 | 17 days | 0 | 0.02 |
| 6 | 5% Na p-nitrobenzoate | 7.6 | 60 days | 0 | 0.01 |
| 7 | 5% K p-nitrobenzoate | — | 26 days | 3 | 0.06 |
| 8 | 5% Na benzoate | 8.5 | 30 days | 2 | 0.04 |
| 9 | 5% Ca p-nitrobenzoate | — | 48 hours | 3 | 0.31 |
| 10 | 5% Mn p-nitrobenzoate | — | 24 days | 3 | 0.48 |

In an additional series of tests, and following the same test procedure, sodium p-nitrobenzoate was further evaluated as a corrosion inhibitor for ethyl cellulose, at a concentration of 5 percent in two other blends of toluene and 2B 95% ethanol. The results were as follows:

| Test | Solvent Blend | pH | Time | Color | Coupon Loss, % |
|---|---|---|---|---|---|
| 11 | 50:50 Toluene:Ethanol | 7.5 | 48 hours | 0 | 0.01 |
| 12 | 70:30 Toluene:Ethanol | 7.5 | 14 days | 0 | 0.01 |

We claim:

1. An ethyl cellulose composition stabilizer against corrosive discoloration in the presence of iron and moisture consisting essentially of:
   A. An ethyl cellulose having an apparent pH greater than about 5.7 measured as a 5 weight percent solution in 80:20 toluene:2B ethanol, and
   B. A small but sufficient amount of sodium o-nitrobenzoate or sodium p-nitrobenzoate or a mixture thereof to inhibit the discoloration of said ethyl cellulose in contact with iron and moisture.

2. The composition of claim 1 where the stabilizer is sodium o-nitrobenzoate.

3. The composition of claim 1 where the stabilizer is sodium p-nitrobenzoate.

4. The composition of claim 1 containing about 0.5–10 wt. % of the sodium o- or p-nitrobenzoate stabilizer based on ethyl cellulose.

5. The composition of claim 1 having an apparent pH of about 5.7–8.0.

6. An ethyl cellulose coating lacquer prepared by dissolving about 5 wt. % of the stabilized ethyl cellulose composition of claim 4 in 80:20 toluene:95% 2B ethanol.

* * * * *